United States Patent

[11] 3,623,463

| [72] | Inventor | Gerrit De Vries<br>2902 N. Stonehill Drive, Altadena, Calif. 91001 |
|---|---|---|
| [21] | Appl. No. | 860,515 |
| [22] | Filed | Sept. 24, 1969 |
| [45] | Patented | Nov. 30, 1971 |

[54] INTERNAL COMBUSTION ENGINE
9 Claims, 6 Drawing Figs.

[52] U.S. Cl. .................................. 123/70, 92/176, 123/193 P
[51] Int. Cl. .................................. F02b 33/22
[50] Field of Search .................................. 123/70, 41.16, 122 A, 193 P; 92/176

[56] References Cited
UNITED STATES PATENTS

| 1,126,831 | 2/1915 | Muller | 123/70 |
| 1,636,937 | 7/1927 | Hult | 123/70 |
| 1,751,385 | 3/1930 | Beaudry | 123/70 |
| 1,904,070 | 4/1933 | Morgan | 123/193 P |
| 1,904,816 | 4/1933 | Beaudry | 123/70 |
| 2,214,891 | 9/1940 | Schrom | 92/176 |
| 3,112,613 | 12/1963 | Nelson | 123/70 |

FOREIGN PATENTS

| 499,775 | 6/1930 | Germany | 123/122 A |

Primary Examiner—Benjamin W. Wyche
Assistant Examiner—Warren Olsen
Attorney—Victor C. Muller ABSTRACT: A four-stroke cycle internal combustion engine in which induction and compression occur in one cylinder and expansion and exhaust occur in another cylinder of greater volume to thereby increase the expansion ratio. The inlet valve for the compression cylinder, the exhaust valve for the expansion or power cylinder, and a transfer valve between the cylinders are all operated by cams affixed to the crankshaft, eliminating a half-speed camshaft and its timing gear or chain drive, whereby all four processes referred to occur in one revolution of the crankshaft rather than in two revolutions of same as in the conventional four-stroke Otto engine. Further optional features include an insulated piston in the power cylinder which effects further increase in efficiency and a heat exchanger for the compressed charge which utilizes exhaust waste heat for effecting a still further increase in efficiency.

PATENTED NOV 30 1971 3,623,463

INVENTOR.
Gerrit DeVries
BY Victor C. Muller
Attorney

INTERNAL COMBUSTION ENGINE

BACKGROUND OF THE INVENTION

The development of the modern internal combustion engine probably owes its beginning to a cycle announced by Carnot in 1824 which stated, in effect, that the maximum energy available was a function of the highest and lowest absolute temperatures which existed during the cycle. While experiments were performed to construct a practical engine operating on this cycle they were unsuccessful. About 1860 an operable engine was developed which operated on the Lenoir cycle; however, this was superseded a few years later by the Brayton and Otto cycles. About the same time the Diesel cycle came into existance. Of the various cycles referred to only the Otto and Diesel cycle survived as practical engines developed to the present time. The Otto cycle may be briefly defined as one in which four distinct operations occur, these being (1) induction of fuel-air mixture, (2) compression of same, (3) expansion of the burning gases, and (4) exhaust of same. In the four-stroke cycle they occur in the same cylinder whereas in the two-stroke cycle induction and compression occur in a second variable volume chamber, such as the engine crankcase. The Diesel cycle is similar except that during induction only air enters the cylinder, fuel being injected when the air is fully compressed. The foregoing is, of course, fully explained in any textbook dealing with the thermodynamics of internal engines and is restated herein only for purposes of general orientation into the more detailed description to be hereinafter set forth.

It has also been generally considered that the thermal efficiency of internal combustion engines is dependent upon the compression ratio, an increase in compression ratio increasing efficiency. The Diesel engine is thus more efficient than the Otto engine since the compression of air only, is considerably higher than the compression of a fuel-air mixture, the latter usually being limited due to premature detonation of same as compression pressure is increased. It is also known that the useful work derived during the power or expansion stroke is a function of the expansion ratio, the work increasing with increase of expansion ratio.

In the four-stroke Otto cycle particularly, the volumetric compression ratio and volumetric expansion ratio are the same since the piston sweeps the same volume. It will thus be apparent that if the expansion could occur a separate cylinder having greater volume than the compression cylinder a greater amount of work could be obtained from the expanding gases. While this general principal was recognized by Beaudry as set forth in U.S. Pat. Nos. 1,751,385 and 1,904,816 the proposed engines apparently never reached widespread acceptance and production, possibly due to the complicated types of valving proposed, the sluggish opening and closing characteristics of sleeve values, or an unduly large transfer conduit. While the present invention utilizes certain of the broad concepts set forth in these patents, it provides numerous improvements and refinements as will subsequently appear.

It is further known that during the expansion or power stroke, which is the hottest part of the cycle, heat is lost through the cylinder wall and piston, the cylinder transferring heat by conduction to a water jacket or to cylinder fins if the cylinder is air cooled. Heat transferred to the pistonhead is conducted to the sidewall or trunk which, in turn, transfers heat to the cylinder wall. The most efficient expansion is adiabatic, that is, without loss or gain of heat but this has only been approached in a practical engine since some cooling is necessary to maintain its cylinder and piston within permissible operating temperatures. It will thus be further apparent that if these heat losses could be minimized an engine could operate at increased efficiency.

In the four-stroke Otto cycle various valve systems have been employed such as sleeve or sliding valves and poppet valves. Of these only the poppet valve has survived practically. The valving system also requires a cam shaft which operates at one-half engine speed thus necessitating the use of timing gears or a speed reduction chain, or timing belt, and sprocket system. It thus becomes further apparent that if such timing mechanism could be eliminated an engine could be constructed more economically and also operate more efficiently due to reduction of friction of its moving parts.

SUMMARY OF THE INVENTION

An internal combustion engine of the four-stroke type is which induction and compression occur in one cylinder and expansion and exhaust occur in another cylinder, the latter having a volume greater than the former, the valves being of poppet type disposed in the cylinder heads and operated by rocker arms and push rods actuated by cams affixed to the crankshaft and rotating at crankshaft speed. The basic engine just described may optionally be modified by an insulated piston in the expansion cylinder, an uncooled cylinder head, or a heat exchanger disposed between the cylinders which utilizes waste exhaust heat for heating a compressed charge delivered from the compressor cylinder to the expansion power cylinder. In its most thermodynamically efficient form all modifications may be employed. The engine may operate either as a carburated fuel-air engine with or without spark ignition or as a solid injection engine in which fuel is added to compressed heated air.

The principal objective of the invention is thus to provide an engine of the type briefly referred to. Further objects, advantages and salient features will become more apparent from the subsequent detailed description, the appended claims and the accompanying drawing to now be briefly described.

DESCRIPTION OF PREFERRED EMBODIMENTS

Figure 1:
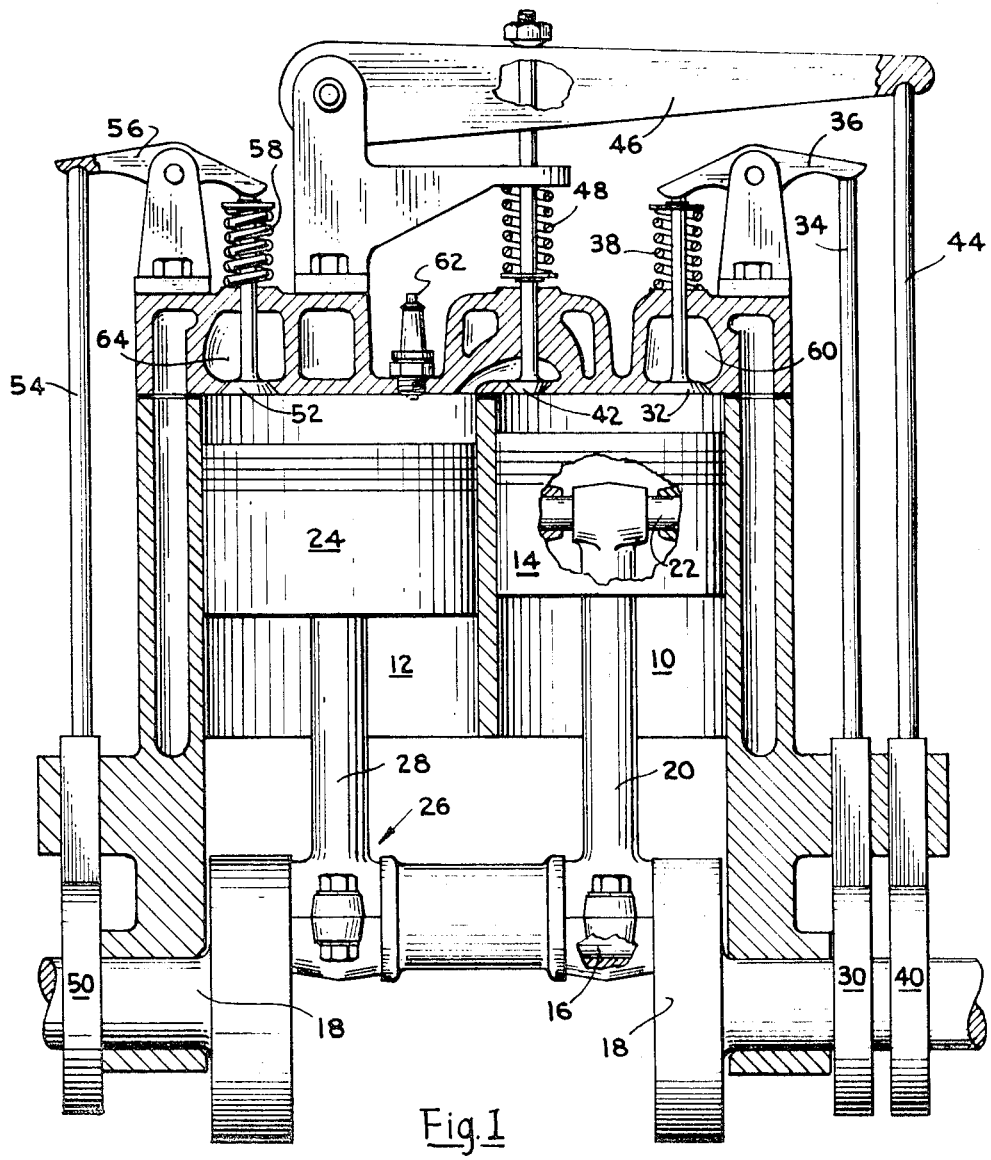
FIG. 1 is a longitudinal central section through the basic construction of the subject of the invention, portions being broken away.

Referring now to the drawing, wing, and first to the embodiment of FIG. 1, which illustrates a construction generally common to the various embodiments, and which for simplicity of illustration shows one pair of cylinders 10, 12, which may be multiplied in pairs as desired. Cylinder 10 and its piston 14 are of conventional construction, piston 14 being connected to crankpin 16 of crankshaft 18 by a connecting rod 20 and wristpin 22. Piston 24 is also of conventional construction and connected to crankpin 26 by a connecting rod 28 and wristpin (not shown). Crankpin pin 26 is angularly disposed slightly ahead of crinkpin 16 so that it reaches top dead center slightly before crankpin 16, the purpose of which will subsequently appear. As illustrated, the diameter of power piston 24 is greater than that of compressor piston 14 to provide a greater displacement of the power piston than that of the compressor piston. Alternatively, the pistons may be of the same diameter and of different strokes, the principal criterion being that regardless of the choice of bore and stroke of each, piston 24 will have a greater swept volume or displacement than piston 14.

A cam 30 is affixed to the crankshaft and opens an intake poppet valve 32 by a push rod 34 and rocker arm 36, the valve being closed by a conventional valve spring 38. Another cam 40, similarly affixed to the crankshaft, opens a transfer poppet a transfer poppet valve 42 by a similar push rod 44 and rocker arm 46, this valve being closed by a conventional valve spring 48. A third cam 50, affixed to the crankshaft, opens an exhaust valve 52 by a like push rod 54 and rocker arm 56, this valve being closed by a spring 58.

In the operation of the parts so far described it will be assumed that compressor piston 14 is at top dead center and is moving downwardly. Valve 32 either begins to open or is already slightly open and a fuel-air mixture is induced into cylinder 10 through a port or manifold 60 to which is connected a carburetor (not shown). At bottom center, or somewhere beyond same, the intake valve closes and the fuel-air mixture is compressed as the piston returns to top center. Shortly before top center, when the desired compression ratio has been attained, transfer valve 42 opens, permitting the compressed mixture to be transferred to cylinder 12. At the beginning of transfer, power piston 24 is in a position of substantial dwell slightly before top center but compressor piston, due to its angular lag, is still moving toward top center and further compressing the mixture which is now partly in the compressor cylinder, partly in the transfer passage between the cylinders, and partly in the clearance volume above the power piston. When the compressor piston has reached top center, completing its compression, the transfer valve closes but since the power piston during transfer is still at a substantial position of dwell, no appreciable expansion of the compressed mixture has taken place in the power cylinder. During the dwell just referred to, the mixture is ignited by a spark plug 62 operated from a suitable electric distributor (not shown). The distributor may be of conventional construction but operates at engine speed, rather than half-speed, so that ignition occurs once in each revolution of the crankshaft rather than every other revolution as in a conventional four-stroke engine. Piston 24 now moves toward bottom center applying power to the crankshaft. At the same time piston 14 is similarly moving, inducing the next fuel-air charge. Near bottom center exhaust valve 52 opens and again closes near top center, piston 24 forcing the spent gas through exhaust manifold or port 64, completing the cycle. As in conventional practice, the valves open or close with lag or lead of the dead centers depending upon the maximum designed speed of the engine and to induce or exhaust in proper timing, taking into consideration the variable inertia of the gases at variable speed.

Ideally, the transfer of the compressed mixture from the compressor cylinder to the power cylinder should take place instantaneously at constant volume. While this ideal cannot be attained it can be approached by minimizing the clearance space above piston 14 when at top center and also by minimizing the volume of the transfer conduit between transfer valve 42 and the power cylinder. As will be apparent from FIG. 1 transfer valve 42 is relatively small compared to intake valve 32 and the volume of the transfer conduit has also been minimized, this being possible since the volume at the end of compression is considerably less than the volume during induction of the mixture As previously set forth, ignition occurs during dwell of the power piston and before expansion of the mixture takes place, thus providing the maximum power which may be obtained during expansion on the power stroke. Normally, ignition occurs just after the transfer valve closes so that the compressor piston is not subjected to the rapid increase in pressure at the instant of ignition. It is to be understood, however, that this ignition timing is not critically essential and that if ignition should occur slightly before the transfer valve closes and while the compressor piston is closely approaching top center, it would be subjected to combustion pressure at minimum compressor volume for only a short interval and upon closing of the transfer valve expansion would take place to ambient pressure when induction of the next charge would occur. As is well known, also, when pressure increases in a combustible mixture moving at high velocity, upon ignition at a point of its flow, the pressure is transmitted to all points but all points are not necessarily burning since flame propagation takes some time. Thus, as just described a pressure increase could occur in the compressor cylinder but without flame which might cause an undesired backfire into the mixture induction manifold.

Figure 2:
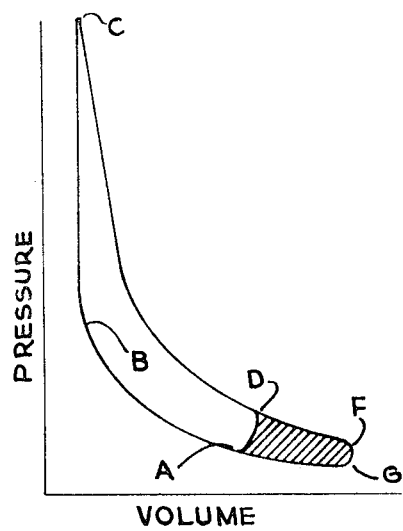
FIG. 2 is a diagram illustrating a gain of efficiency of the FIG. 1 construction over a conventional engine.

FIG. 2 generally illustrates a comparison between a conventional Otto engine and present engine. In the Otto engine a fuel-air mixture is induced at constant pressure (not shown) on a suction stroke and compression begins at point A. The compression pressure increases to about top center where ignition occurs at B and pressure rapidly increases at constant volume. Expansion occurs between C and D where the exhaust valve opens and pressure drops at substantially constant volume to point A where the cycle is repeated. The area within the curve, as is well known, is a measure of the work done during the cycle. In the present cycle, the increased expansion obtained by expanding in a separate cylinder is indicated by shaded area DFGA which, as will be apparent, is a gain in work and increase in thermal efficiency. The shaded area may bear any desired relationship to the unshaded area and is a function of the relative swept volumes of the two cylinders. An additional thermodynamic gain also occurs since the cooler strokes, suction and compression, occur in one cylinder and the hotter strokes, expansion and exhaust, occur in another cylinder. Since the temperature excursions or variations in each cylinder are thus reduced as compared with the temperature variations in a conventional four-stroke engine, the compression stroke and expansion stroke more nearly approach adiabatic, that is, there is a reduction in heat transfer through the cylinder walls of both cylinders.

Figure 3:
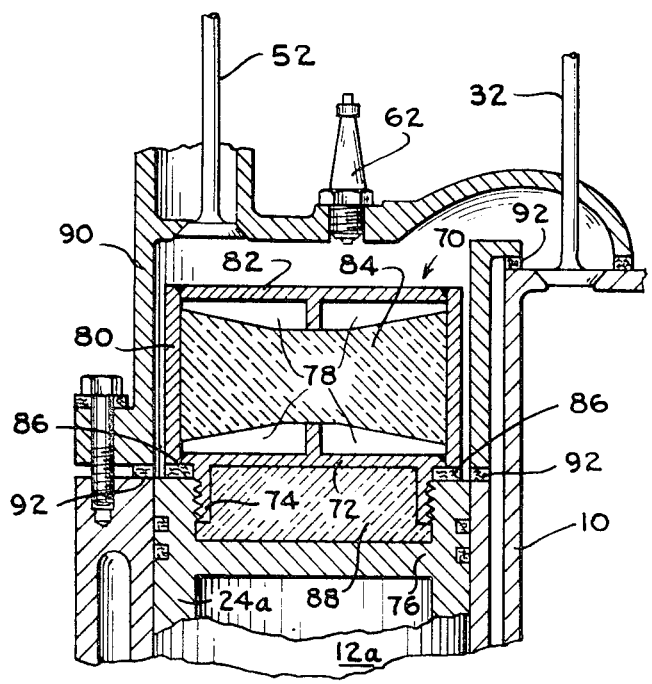
FIG. 3 is an alternative form of a portion of FIG. 1.

FIG. 3 illustrates an alternative form of the invention which further increases efficiency. In this construction the engine is essentially the same as in FIG. 1 but the expansion or power cylinder 12a and its piston 24a are modified to reduce heat loss particularly during the expansion stroke. In this construction piston 24a is provided with a false drum-shaped head 70, its axial length preferably being about equal to the stroke of the piston. While the false had may be constructed in various ways the manner chosen for illustration comprises a lower end wall 72 secured to a threaded collar 74, the latter threadedly engaging pistonhead 76. Ribs 78 may be employed if desired to strengthen the lower end wall. A tube 80 is secured to lower end wall 72 and closed at the top by an end wall 82, reinforced by like ribs 78. The enclosed volume is filled with heat-insulating material 84 which is preferably compressed before applying one of the end walls and welding it to tube 80. Tube 80 is thus under slight tension but as will be apparent is slightly smaller than the piston so that it has clearance (shown exaggerated) in the cylinder bore. An annular head-insulating gasket 86 is disposed between the false head and the piston the latter, as illustrated, being provided with a recess containing insulating material 88. Cylinder head 90 is secured to the cylinder in any well known manner but heat-insulating gaskets 92 are disposed between the head and cylinder to thereby isolate it and minimize heat transfer between the uncooled head and the cooled cylinder, illustrated as being water cooled. As will be apparent, since substantially no coolant flows to the cylinder head it operates at high temperature as compared to the water-cooled cylinder wall. A spark plug 62 is provided but operates only when the cylinder head is cold. When the cylinder head reaches normal operating condition the temperature within same is sufficient to ignite the fuel-air mixture which has been transferred from the cylinder 10. If desired, a thermostat (not shown), responsive to cylinder head temperature may be employed to discontinue the electrical ignition when the cylinder head reaches normal operating temperature. In this construction the uncooled cylinder head remains at substantially constant high temperature somewhat below a wakening point of the metal and since a minimum of heat is conducted to the cooled cylinder to which is attached, the combustion volume forms a residence in which expansion may take place under conditions more closely approaching adiabatic as compared with a cylinder which varies in temperature during the cyclic operation of a piston in same.

Figure 4:
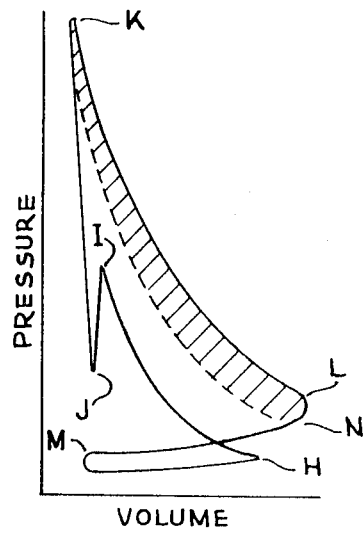
FIG. 4 is a similar diagram illustrating a gain of efficiency of the construction of FIG. 3, over that of FIG. 1.

FIG. 4 generally illustrates the pressure-volume conditions which exist in the uncooled head and insulated piston construction just described. The curve between H and I illustrates compression in the small cylinder. At point I the transfer valve opens and pressure drops to point J where ignition occurs. Pressure than increases at substantially constant volume to point K where expansion begins. At point L the exhaust valve opens and exhaust occurs on the return stroke from point L to point M. Dotted curve KN depicts an Otto cycle expansion curve with a normally cooled cylinder wall which is nonadabatic due to heat loss during expansion. Curve KL depicts the expansion with the uncooled head and insulated piston and the shaded area indicates the gain in work by the latter construction as compared to the former.

Figure 5:
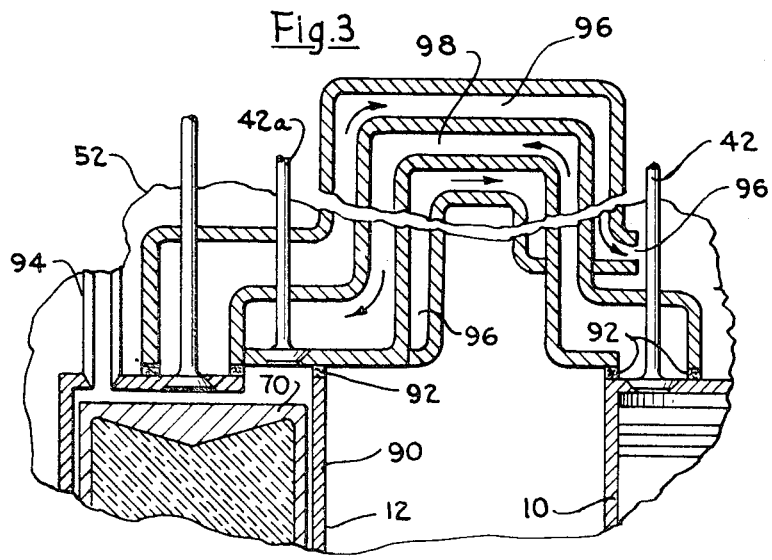
FIG. 5 is another alternative form of the subject of the invention.

FIG. 5 illustrates another variant of the basic engine of FIG. 1 and employing the uncooled cylinder head 90 of FIG. 3. The insulated false pistonhead 70 of FIG. 3 is also illustrated but this is optional and may be omitted if desired with some sacrifice of efficiency. The principal difference resides in the use of a heat exchanger which transfers exhaust waste heat to compressed air transferred from the compression cylinder. The compression cylinder is thus the same but compresses only air rather than a fuel-air mixture, the fuel in this case being added by solid injection through an injector nozzle 94 in the same manner as in a diesel engine. The exhaust from the power cylinder passes in counterflow manner through a conduit 96 which surrounds a conduit 98 (illustrated as broken and of any desired length) through which air is delivered from the compression cylinder to the power cylinder, thereby heating it and effecting a thermodynamic gain by utilizing heat which would otherwise be lost to the atmosphere. A second transfer valve 42a is preferably employed in this construction. In operation, transfer valve 42 opens, as previously described, transferring compressed air to conduit 98. When valve 42a opens the compressed and further-heated air in conduit 98 is delivered to the expansion cylinder, When valve 42a closes a metered quantity of fuel is injected through nozzle 94, the air being sufficiently heated to cause ignition in the same manner as in a diesel engine. It is to be understood that the timing of the two transfer valves is such that the compressed air in heat exchanger conduit 98 preferably remains at substantially constant pressure.

Figure 6:
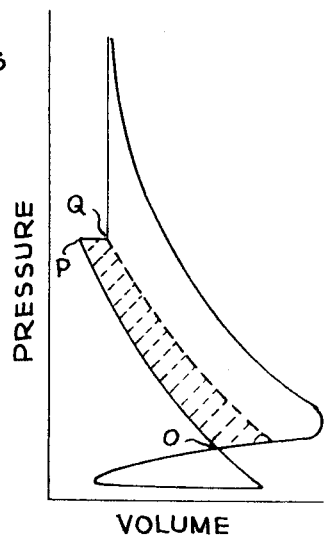
FIG. 6 is a similar diagram illustrating a gain of efficiency of the construction of FIG. 5 over that of FIG. 3.

FIG. 6 illustrates the pressure volume conditions of the construction of FIG. 5. The unshaded upper area of the curve includes the shaded areas of FIGS. 2 and 4, that is, the gain by increased expansion in a separate cylinder and increased efficiency by use of the insulated piston. The shaded area indicates the further gain of efficiency by use of the heat exchanger. It will be noted that compression occurs along line OP in the compression cylinder and heating from the heat exchanger along line PQ. At point Q the second transfer valve 42a opens, delivering the compressed charge to the expansion cylinder with a slight increase in volume at constant pressure. At this point fuel is injected, ignition occurs, and pressure increases to maximum after which expansion occurs.

It will now be apparent that three separate and distinct gains are attained over the conventional four-stroke engine where all processes occur in the same cylinder. Thus, the shaded area of FIG. 2 illustrates the gain by use of a separate expansion cylinder. The shaded area of FIG. 4 illustrates the further gain over FIG. 2 by the addition of the insulated piston and the shaded area of FIG. 6 illustrates the further gain over FIG. 4 by the addition of the heat exchanger. The basic engine will thus always be employed but the further gains attained by the FIG. 3 and FIG. 5 constructions are optional and may be employed either singly or in combination, FIG. 5, of course, illustrating the latter.

For simplicity of disclosure the engine cylinders have been illustrated as the so-called vertical in-line type. They may be oriented, however, in any well known manner, such as horizontally, inverted, angularly such as in V-engines, or radially as in aircraft engines. The number of pairs of cylinders may be multiplied as desired and will normally exceed the one pair illustrated. It will thus be apparent that "top", "upper", "bottom", and "lower" are only relative terms of description, their analogous meanings being dependent upon the particular orientation of the cylinders.

Obviously many modifications and variations of the present invention are possible in the light of the above teachings. It is therefore to be understood that within the scope of the appended claims the invention may be practiced otherwise than as specifically described.

What is claimed is:

1. In an internal combustion engine of the four-stroke type having at least one pair of cylinders with reciprocating pistons therein and closed by cylinder heads, one being an induction and compressor piston and the other being an expansion and exhaust piston, the expansion piston having a displacement greater than the compressor piston, the pistons being connected by connecting rods to a pair of crankpins on a crank shaft, the crankpins being in closely spaced angular phase relationship, the improvements, in combustion, comprising:

a. the cylinder containing the induction and compressor piston having an inlet poppet valve in its head and the cylinder for the expansion and exhaust piston having an exhaust poppet valve (associated therewith) in its head;
   b. a transfer conduit in the heads communicating the upper ends of the cylinders and having a first end forming a first port in the head of the induction and compressor cylinder and a second end forming a second port in the head of the expansion and exhaust cylinder,
   c. a transfer poppet valve in the head of the induction and compressor cylinder for opening and closing said first port, adapted to have a relatively short duration of opening while the compressor piston is near its top center,
   d. said compressor piston having a minimized clearance volume thereabove when at its top center,
   e. the construction and arrangement being such that while said transfer valve is open, substantially all of the gas compressed by the compressor piston is transferred, at a rate approaching instantaneously, through said transfer conduit while both pistons remain substantially at positions of dwell at their top centers.

2. An engine in accordance with claim 1 including a hollow metallic false pistonhead secured to the head of the expansion piston, said false pistonhead being filled with compressed insulating material other then gas or liquid, and having a substantial length to materially reduce heat loss to the expansion cylinder, an uncooled metallic cylinder head for the expansion cylinder, and heat-insulating material disposed between same and the expansion cylinder, said metallic false pistonhead and said metallic cylinder head forming walls of a closed metallic envelope in which a temperature may be maintained sufficient to support spontaneous combustion of a fuel-air mixture therein.

3. An engine in accordance with claim 1 including a port in the compressor cylinder head communicating the intake valve with a carburetor for furnishing a fuel-air mixture to the compressor cylinder, and a spark plug for the expansion cylinder for initiating combustion of the compressed fuel-air mixture delivered to same.

4. An engine in accordance with claim 1 including a port in the compressor cylinder head communicating the inlet valve with ambient air for furnishing air, without fuel, to the compressor cylinder, and a fuel injection nozzle for the expansion cylinder for injecting fuel into same.

5. An engine in accordance with claim 1 including a second transfer valve associated with said transfer conduit, one transfer valve being disposed in the head of the compressor cylinder and the other being disposed in the head of the expansion cylinder, the transfer conduit being disposed therebetween.

6. An engine in accordance with claim 5 including an exhaust conduit disposed in heat exchange relationship to the transfer conduit through which exhaust gas from the expansion cylinder may pass to thereby transfer waste heat to gas delivered to the transfer conduit.

7. An engine in accordance with claim 5 including a port in the compressor cylinder head communicating the inlet valve with ambient air for furnishing air, without fuel, to the compressor cylinder, and a fuel injection nozzle for the expansion cylinder for injecting fuel into same.

8. An engine in accordance with claim 5 including a hollow metallic false pistonhead secured to the head of the expansion piston, said false pistonhead being filled with compressed insulating material, other than gas or liquid, and having a substantial length to materially reduce heat loss to the expansion cylinder, and uncooled metallic cylinder head for the expansion cylinder, and heat-insulating material disposed between same and the expansion cylinder, said metallic false pistonhead and said metallic cylinder head forming walls of a closed metallic envelope in which a temperature may be maintained sufficient to support spontaneous combustion of a fuel-air mixture therein.

9. An engine in accordance with claim 1 wherein said valves are operated by three separate cams affixed to the crankshaft, said separate cams each operating separate push rods and rocker arms associated with the respective valves.

* * * * *